US006363236B1

(12) United States Patent
Ishizuka et al.

(10) Patent No.: US 6,363,236 B1
(45) Date of Patent: Mar. 26, 2002

(54) RELEASE OIL REGULATING BLADE, FIXING DEVICE, AND IMAGE-FORMING APPARATUS

(75) Inventors: Jiro Ishizuka, Shizuoka; Kazuo Kishino, Kanagawa; Masaaki Takahashi, Saitama; Hideo Kawamoto, Tokyo; Mitsuhiro Ota, Shizuoka; Osamu Soutome; Yuji Kitano, both of Kanagawa, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/624,204

(22) Filed: Jul. 24, 2000

(30) Foreign Application Priority Data

| | | |
|---|---|---|
| Jul. 27, 1999 | (JP) | 11-212353 |
| Aug. 30, 1999 | (JP) | 11-243534 |
| Feb. 28, 2000 | (JP) | 2000-051581 |

(51) Int. Cl.[7] .......... F03G 15/20
(52) U.S. Cl. .......... 399/325; 118/621
(58) Field of Search .......... 399/324, 325, 399/326; 118/60, 261; 432/60

(56) References Cited

U.S. PATENT DOCUMENTS

| | | | | |
|---|---|---|---|---|
| 3,929,096 A | * | 12/1975 | Thettu | 118/60 |
| 5,717,987 A | * | 2/1998 | Fromm | 399/325 |
| 6,035,173 A | | 3/2000 | Kagawa | 399/325 |

FOREIGN PATENT DOCUMENTS

| | | |
|---|---|---|
| JP | 5-158371 | 6/1993 |
| JP | 8-146809 | 6/1996 |
| JP | 10-207279 | 8/1998 |

* cited by examiner

*Primary Examiner*—Joan Pendegrass
(74) *Attorney, Agent, or Firm*—Fitzpatrick, Cella, Harper & Scinto

(57) ABSTRACT

A blade for regulating the amount of a release oil to be supplied is placed so as to abut on a fixing member or on a member for controlling the amount of the release oil to be supplied to the fixing member. The abutting surface of the blade is composed of a silicone rubber layer. Alternatively, the blade includes a plate-shaped elastic body and a silicone rubber layer formed on the tip of the elastic body. A fixing device including the blade and an image-forming apparatus including the fixing device are also disclosed.

17 Claims, 4 Drawing Sheets

RELEASE OIL REGULATING BLADE, FIXING DEVICE, AND IMAGE-FORMING APPARATUS

BACKGROUND OF THE INVENTION

1. Field of the Invention

The present invention relates to a blade for regulating a release oil used in fixing devices, such as those used in electrophotographic copying machines and printers, and also relates to a fixing device for performing heat-pressure fixing of an unfixed image by passing a recording member carrying the unfixed image between fixing members which are in contact with each other under pressure, and to an image-forming apparatus.

2. Description of the Related Art

In a fixing apparatus, such as those used in an electrophotographic copying machine or printer, in general, a fixing roller and a pressure roller, which are heated by halogen heaters or the like, are brought into contact with each other under pressure, and a recording sheet carrying a toner image is transported through the nip to fix the toner image on the recording sheet. Instead of the fixing roller, a fixing belt or a fixing film may be used. Such members for fixing toner are referred to as fixing members.

In order to prevent toner from being offset and to improve releasability (the ability to release toner and foreign matter), a release oil is occasionally used. In many cases, a blade for regulating the release oil is used so that an appropriately small amount of the release oil is uniformly applied. The blade abuts on a roller so that its edge is brought into contact with the roller, and by passing the release oil through the nip thereof, an appropriate amount of the release oil can be uniformly applied.

The blade may be placed so as to abut on an application roller which is in contact with a fixing roller or to directly abut on the fixing roller. It is also known that a similar blade may be placed so as to abut on a pressure roller in order to scrape off excess release oil, excess toner, and dust.

As the blade, a metal blade or a fluororubber blade is usually used. It is also known that the surface of the blade may be coated with a layer composed of a fluorine-containing resin.

Japanese Patent Laid-Open No. 5-158371 discloses a blade for decreasing the mechanical load of a fixing roller, in which a low-friction member composed of a fluorine-containing resin is attached to the outer periphery of a rubber blade which is in contact with the fixing roller. Japanese Patent Laid-Open No. 10-207279 describes an example in which the surface of a rubber member of a blade is coated with a layer composed of a fluorine-containing resin and teaches that the thickness of the layer is preferably set at 25 to 100 $\mu$m. Japanese Patent Laid-Open No. 8-146809 discloses a fixing device in which a blade coated with a fluorine-containing resin is used as a blade abutting on a pressure roller, and as the fluorine-containing resin, a layer composed of a fluorine-containing resin is used.

A blade which supplies a release oil to a fixing member must uniformly regulate the oil and must maintain its function for a long period of time. In particular, recently, since the amount of coating of the release oil has been reduced, even slight nonuniformity of the release oil may deteriorate the image quality. That is, it is essential to prevent nonuniformity in applying the release oil.

At the same time, the blade for regulating the release oil must have high releasability of foreign matter, such as toner and dust. In particular, when a small amount of the release oil is applied, even slight adhesion of foreign matter may cause nonuniformity in applying the release oil.

SUMMARY OF THE INVENTION

Accordingly, it is an object of the present invention to provide a blade which can maintain uniformity in applying release oil for a long period of time.

It is another object of the present invention to provide a fixing device in which release oil can be uniformly applied for a long period of time even when a small amount of the release oil is applied, and to provide an image-forming apparatus using the fixing device.

In accordance with one aspect of the present invention, a blade is placed so as to abut on a fixing member or on a to member which controls the amount of a release oil to be supplied to the fixing member in order to regulate the amount of the release oil to be supplied, and the abutting surface of the blade is composed of a silicone rubber layer.

In accordance with another aspect of the present invention, a blade is placed so as to abut on a fixing member or on a member which controls the amount of a release oil to be supplied to the fixing member in order to regulate the amount of the release oil to be supplied, and the blade includes at least a plate-shaped elastic body and a silicone rubber layer formed on the tip of the elastic body.

In the present invention, since the abutting surface of the blade is composed of the silicone rubber layer, the releasability of foreign matter, such as toner and dust, is improved, and nonuniformity in applying the release oil does not occur.

Additionally, since the blade of the present invention includes the abutting surface composed of the silicone rubber layer, the characteristics of the underlying layer are not greatly impaired, and by appropriately selecting a material for the underlying layer, the following advantages can be obtained. That is, if the underlying layer is composed of an elastic body, a blade having satisfactory elasticity can be obtained. If the underlying layer is composed of a fluororubber, a blade having satisfactory heat resistance can be obtained. If the underlying layer is composed of a silicone rubber, a blade having good compression set characteristics can be obtained. If the underlying layer is composed of an elastic body in which a silicone rubber layer is coated with a fluororubber, a blade having good compression set characteristics and resistance to swelling can be obtained. If the underlying layer is composed of a metal, a blade which can be produced by a simple process is obtainable.

Further objects, features and advantages of the present invention will become apparent from the following description of the preferred embodiments with reference to the attached drawings.

DESCRIPTION OF THE PREFERRED EMBODIMENTS

Figure 9A:
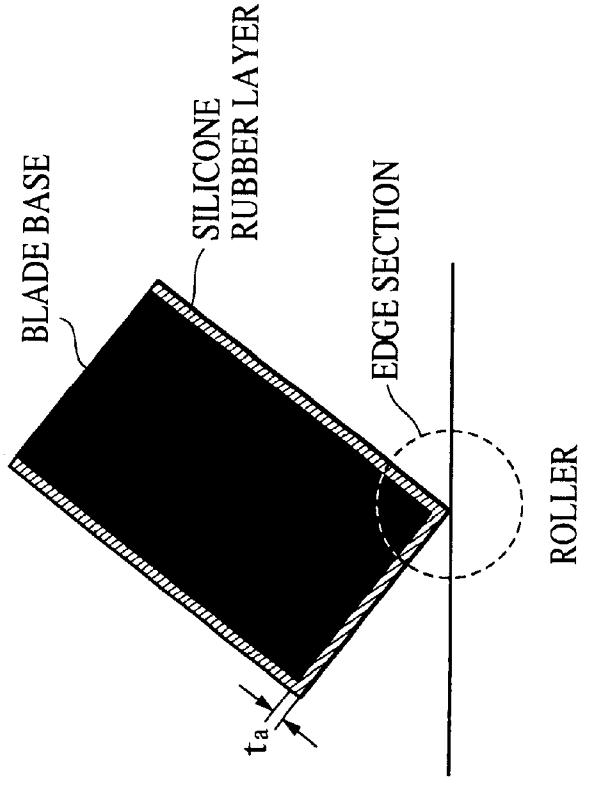
FIGS. 9A and 9B are schematic diagrams which illustrate how blades of the present invention are used.
Figure 9B:
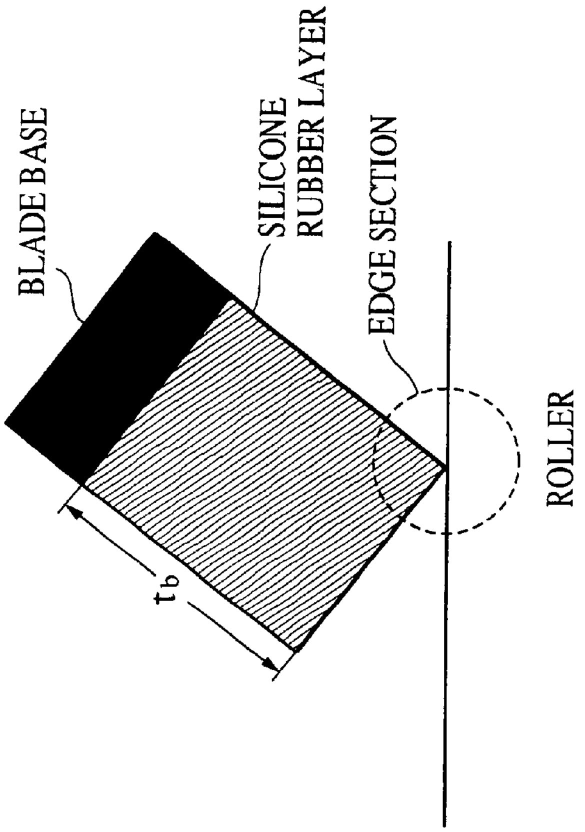

With respect to the shape of a silicone rubber layer in the present invention, for example, in a first embodiment shown in FIG. 9A, a silicone rubber layer is formed as a surface layer (outermost layer) on the surface of a blade base and constitutes an edge section, and in a second embodiment shown in FIG. 9B, a silicone rubber layer is formed as a tip layer on the surface of the tip of a blade base composed of a plate-shaped elastic body and constitutes an edge section.

Any type of silicone rubber may be used for a silicone rubber layer in the present invention as long as it has satisfactory releasability. Above all, dimethylsilicone rubber having superior releasability is preferably used.

The silicone rubber layer may be obtained, for example, in the first embodiment, by applying a solution containing a silicone rubber material to the blade base, followed by drying and curing. In such a case, the thickness of the silicone rubber layer (indicated by $t_a$ in FIG. 9A) is preferably 1 $\mu$m or more and 100 $\mu$m or less, and more preferably, 50 $\mu$m or less. By employing such a first embodiment, it is possible to maintain satisfactory uniformity in applying a release oil without impairing the elasticity and shape of the underlying layer.

In the second embodiment, a silicone rubber layer having a predetermined thickness is formed, for example, by molding, etc., on the tip of a blade base composed of a plate-shaped elastic body. In such a case, in order to ensure that the silicone rubber layer formed on the tip has an effective thickness when abutting on a roller, the thickness of the silicone rubber layer (indicated by $t_b$ in FIG. 9B) is preferably 0.1 mm or more, more preferably 0.5 mm or more, and preferably 5 mm or less, more preferably 3 mm or less. By employing such a second embodiment, the entire blade has elastic characteristics, and it is possible to uniformly apply a release oil.

Furthermore, by forming the silicone rubber layer only on the tip of the blade base as in the case of the second embodiment, a satisfactory shape stability can be obtained. That is, when a silicone oil is used as the release oil, although the silicone rubber layer may be swollen by the silicone oil, by forming the silicone rubber layer only on the tip of the blade base, the change in volume compared to the entire blade can be minimized.

In addition, in the second embodiment as shown in FIG. 9B, after the silicone rubber layer is formed with a thickness $t_b$ that is larger than a predetermined thickness, the resulting silicone rubber layer may be cut in the longitudinal direction so that the thickness $t_b$ becomes the predetermined thickness. Since the silicone rubber layer formed in such a manner has a sharp edge section, it is possible to regulate the release oil more reliably.

The cut surface may be in any form as long as it is not disadvantageous to the regulation of the release oil, and for example, the silicone rubber layer is cut parallel to the surface of the tip of the plate-shaped elastic body. By forming the silicone rubber layer by cutting as described above, a blade having superior characteristics of the edge section which is used for abutting can be easily obtained.

As a fixing member in the present invention, a fixing roller, a fixing belt, a fixing film, or the like may be used. Examples of a member for controlling the amount of release oil supplied to the fixing member are an oil application roller and a pressure roller which are in contact with the fixing member. The blade of the present invention is placed so as to directly abut on the fixing member or so as to abut on the member for controlling the amount of release oil supplied to the fixing member. That is, the present invention can be implemented when the blade directly abuts on the fixing member, when the blade abuts on the oil application roller which is in contact with the fixing member, or when the blade abuts on the pressure roller which is in contact with the fixing member.

Any type of release oil may be selected depending on the fixing member and the purposes. For example, a release oil mainly composed of a silicone oil, more specifically, dimethylsilicone oil, may be used.

The silicone rubber layer in the present invention may be formed on the surface of a blade base made of an elastic body. In the present invention, since the abutting surface toward the fixing member, etc. is composed of the silicone rubber layer, the characteristics of the elastic underlying layer are not greatly impaired, and by employing the structure described above, a blade having elasticity can be obtained.

As the elastic body, for example, if a fluororubber is used, higher heat resistance can also be exhibited, and a blade having more satisfactory heat resistance can be obtained. Any type of fluororubber may be selected as long as it has satisfactory elasticity and heat resistance. For example, with respect to vulcanization-type rubbers, peroxide vulcanization-type fluororubbers, polyol vulcanization-type fluororubbers, polyamine vulcanization-type fluororubbers, and the like may be used.

In particular, when a release oil mainly composed of a silicone oil, specifically, dimethylsilicone oil is used, in view of the stability of the size of the blade, preferably, the blade base is composed of an elastic body made of a fluororubber.

When the blade base is composed of the elastic body made of the fluororubber, in order to attain a satisfactory shape stability of the blade, the elastic body constituting the blade base has a rate of swelling of preferably 1% or less, and more preferably, of 0.8% or less in a release oil at 100° C.

As the elastic body, a silicone rubber may be used. The elastic body composed of the silicone rubber can impart higher setting resistance to the blade, and the blade having good compression set characteristics can be obtained. Any type of silicone rubber may be selected as long as it has satisfactory elasticity and good compression set characteristics. For example, with respect to vulcanization-type silicone rubbers, hot vulcanization-type silicone rubber (HVR), liquid silicone rubber (LSR), and low-temperature vulcanization-type (LTV) silicone rubber may be used.

As the elastic body, an elastic body in which a silicone rubber is coated with a fluororubber may be used. The elastic body in which the silicone rubber is coated with the fluororubber can impart higher setting resistance and resistance to swelling to the blade, and the blade having good compression set characteristics and resistance to swelling can be obtained. Any type of silicone rubber may be selected as long as it has satisfactory compression set characteristics. For example, with respect to vulcanization-type silicone rubbers, hot vulcanization-type silicone rubber (HVR), liquid silicone rubber (LSR), and low-temperature vulcanization-type (LTV) silicone rubber may be used. Any type of fluororubber may be selected as long as it has resistance to swelling. For example, with respect to vulcanization-type fluororubbers, peroxide vulcanization-type fluororubbers, polyol vulcanization-type fluororubbers, polyamine vulcanization-type fluororubbers, and the like may be used.

In particular, when a release oil mainly composed of a silicone oil, specifically, dimethylsilicone oil is used, in view of the size stability of the blade, preferably, the blade base is composed of an elastic body in which a silicone rubber is coated with a fluororubber.

When the blade base is composed of the elastic body in which the silicone rubber is coated with the fluororubber, in order to attain a satisfactory shape stability of the blade, the elastic body constituting the blade base has a rate of swelling of preferably 1% or less, and more preferably, of 0.8% or less in a release oil at 100° C.

In the present invention, the silicone rubber layer may be formed on the surface of a metal blade base. In such a structure, by forming the silicone rubber layer on the surface of the metal blade base, a blade which can be produced by a simple process is obtainable. The metal may be selected appropriately depending on the application, and for example, stainless steel (SUS), aluminum, or phosphor bronze may be used.

By using the blade described above, a fixing device and an image-forming apparatus in which a release oil can be uniformly applied for a long period of time, thus being highly durable, can be fabricated.

That is, in a fixing device for heat-pressure fixing of an unfixed image on a recording member, which includes fixing members rotatably disposed and abutting on each other for sandwiching and passing the recording member through the abutting section, and a blade for regulating the amount of a release oil to be supplied to the fixing members, for example, in a manner similar to that in the first embodiment, a silicone rubber layer may be provided on the surface of the blade.

Alternatively, in a fixing device for heat-pressure fixing of an unfixed image on a recording member, which includes fixing members rotatably disposed and abutting on each other for sandwiching and passing the recording member through the abutting section, and a blade for regulating the amount of a release oil to be supplied to the fixing members, for example, in a manner similar to that in the second embodiment, the blade may include a plate-shaped elastic body and a silicone rubber layer formed on the tip of the elastic body.

It is also possible to fabricate an image-forming apparatus including a fixing device in which, for example, in a manner similar to that in the first embodiment, a silicone rubber layer is provided on the surface of a blade, and an image-forming unit for forming an unfixed image on a recording member, and the unfixed image formed on the recording member by the image-forming unit is fixed by the fixing device.

Alternatively, it is also possible to fabricate an image-forming apparatus including a fixing device in which, for example, in a manner similar to that in the second embodiment, a blade which includes at least a plate-shaped elastic body and a silicone rubber layer formed on the tip of the elastic body is disposed, and an image-forming unit for forming an unfixed image on a recording member, and the unfixed image formed on the recording member by the image-forming unit is fixed by the fixing device.

The present invention will be described in detail based on the following examples. It is to be understood that the invention is not limited to the examples and the invention is intended to cover various modifications and changes in design within the scope of the invention.

In order to verify the advantages of the present invention, blades as examples and comparative examples were fabricated. The resulting blades were mounted on a heat-pressure fixing device, and the heat-pressure fixing device was incorporated into an image-forming apparatus to verify the advantages.

(Description of Image-Forming Apparatus)

An image-forming apparatus, such as a copying machine, a printer, or a facsimile machine, forms an image on a sheet based on received image information.

In an image-forming apparatus, a laser beam based on received image information is emitted by a laser scanner, and a photosensitive drum built in a processing cartridge is irradiated with the laser beam.

Thereby, a latent image is formed on the photosensitive drum, and the latent image is developed by the processing cartridge using toner. The photosensitive drum and the processing cartridge constitute an image-forming unit.

On the other hand, recording sheets held in a sheet loading tray are fed, sheet by sheet, by a feed roller and a separation means, and are further transported downstream by conveyor rollers. The toner image formed on the photosensitive drum is transferred onto the transported sheet by a transfer means.

The sheet having the unfixed toner image is further transported downstream, and the toner image is fixed by a heat-pressure fixing device on the sheet, and then the sheet is discharged from the apparatus by a discharge roller.

For the experiment, a commercially available color copying machine (trade name "Color Laser Copier PIXEL Dio 950" manufactured by CANON KABUSHIKI KAISHA) was used as an image-forming apparatus, and a heat-pressure fixing device built in the above color copying machine as a standard accessory was used as a heat-pressure fixing device.

(Description of Heat-pressure Fixing Device)

Figure 1:
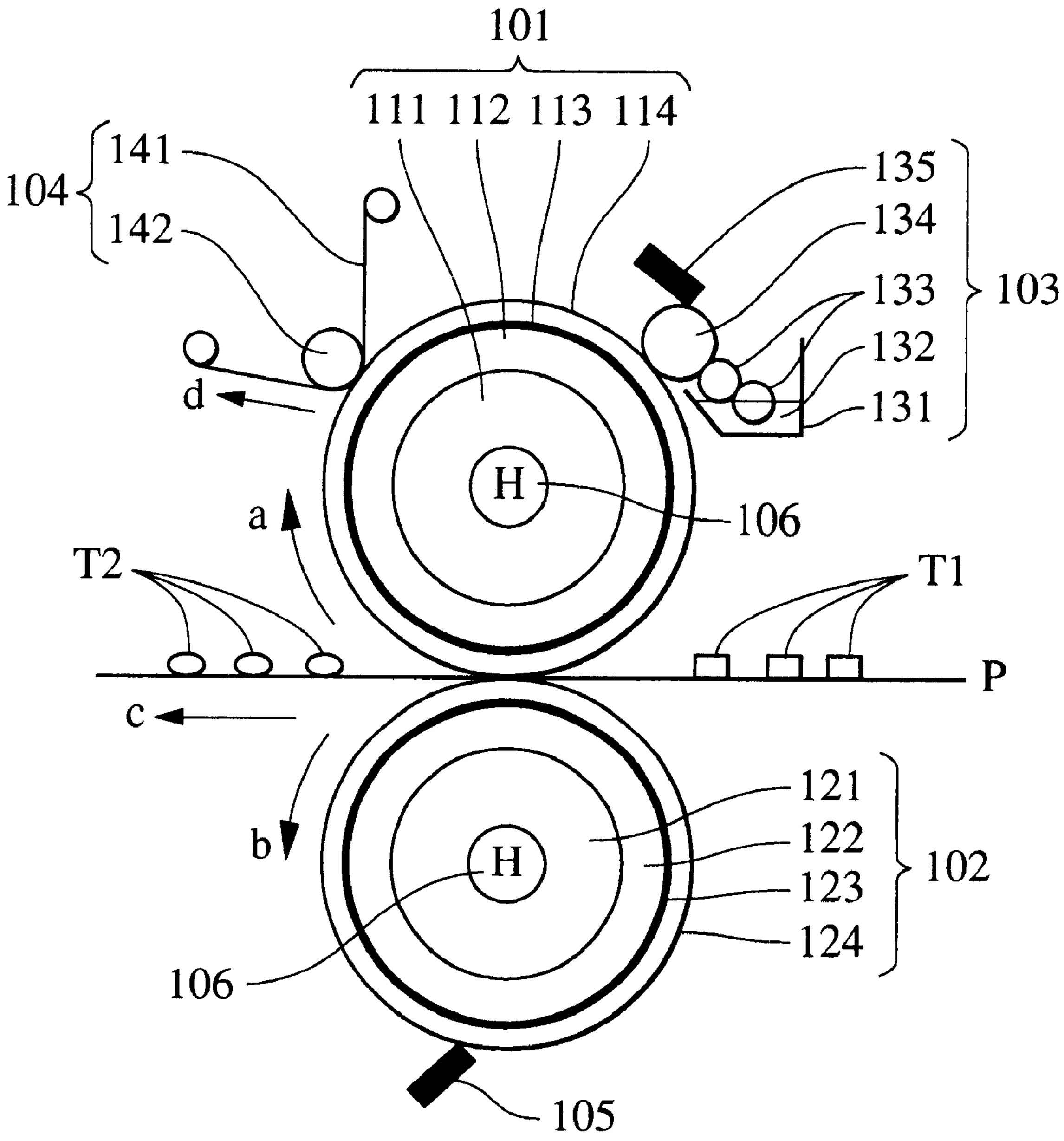
FIG. 1 is a sectional view of a first heat-pressure fixing device used in evaluating examples of the present invention.

Next, a heat-pressure fixing device will be described in detail. FIG. 1 is a sectional view of a first heat-pressure fixing device used in order to verify the advantages of the present invention. The heat-pressure fixing device includes a fixing roller 101 and a pressure roller 102 which are disposed in pair and pressed against each other to form a nip width of approximately 7 mm.

The fixing roller 101 includes a core bar 111 comprising aluminum or the like, as a substrate, an elastic layer 112 composed of a high-temperature vulcanization-type (HTV-type or millable type) silicone rubber formed on the core bar 111 with a thickness of approximately 2 mm, an oil-barrier layer 113 composed of a fluororubber formed on the elastic layer 112 with a thickness of approximately 50 $\mu$m, and a surface layer 114 composed of dimethylsilicone rubber formed on the oil-barrier layer 113 with a thickness of approximately 200 $\mu$m. The fixing roller 101 has an outer diameter of approximately 60 mm.

The pressure roller 102 also includes a core bar 121 comprising aluminum or the like, as a substrate, an elastic layer 122 composed of a high-temperature vulcanization-type (HTV-type or millable type) silicone rubber formed on the core bar 121 with a thickness of approximately 2 mm, an oil-barrier layer 123 composed of a fluororubber formed on the elastic layer 122 with a thickness of approximately 50 $\mu$m, and a surface layer 124 composed of dimethylsilicone rubber formed on the oil-barrier layer 123 with a thickness of approximately 200 $\mu$m. The pressure roller 102 also has an outer diameter of approximately 60 mm.

An oil application unit 103 for uniformly applying a release oil and a cleaning web unit 104 for removing smudges, such as toner, adhered to the fixing roller 101 are disposed so as to be brought into contact with the fixing roller 101.

The oil application unit 103 includes an oil pan 131 for retaining a release oil 132, metallic oil-drawing rollers 133 for drawing up the release oil 132 while rotating, an elastic oil application roller 134 for applying the drawn release oil 132 to the surface of the fixing roller 101 while rotating, and an oil-regulating blade 135 for controlling and regulating the amount of the release oil on the oil application roller 134.

Figure 2:
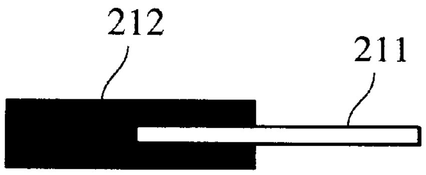
FIG. 2 is a schematic diagram of a blade as a standard accessory in an experimental machine.

FIG. 2 is a schematic diagram showing a cross section of the oil-regulating blade 135. The oil-regulating blade 135 includes a metallic plate 211 as a support and a fluororubber layer 212.

In the experiment, as the release oil 132, dimethylsilicone oil (trade name "KF-96SS" manufactured by Shin-Etsu Chemical Co., Ltd.) having a kinematic viscosity of 300 cSt (centistokes) at 25° C. was used.

The cleaning web unit 104 includes a cleaning web 141 composed of a nonwoven fabric for removing smudges, such as toner, and a web-pressing elastic roller 142 for pressing the cleaning web 141 against the surface of the fixing roller 101. The cleaning web 141 is gradually taken up in the d direction shown in FIG. 1.

An oil-removing blade 105 for removing excess release oil is disposed so as to be brought into contact with the pressure roller 102.

A heater 106 is disposed in the center of each of the core bar 111 of the fixing roller 101 and the core bar 121 of the pressure roller 102. The energizing timing of the heater 106 is controlled so that the surface is maintained at a predetermined temperature based on the temperature detected by a thermocouple (not shown) disposed in contact with each of the surface layer 114 and the surface layer 124.

In the first heat-pressure fixing device shown in FIG. 1, the fixing roller 101 rotates in the a direction, the pressure roller 102 rotates in the b direction, and a sheet of paper P is conveyed in the c direction, whereby unfixed toner T1 is converted into fixed toner T2 by passing through the nip between the fixing roller 101 and the pressure roller 102, thus forming an image.

Figure 7:
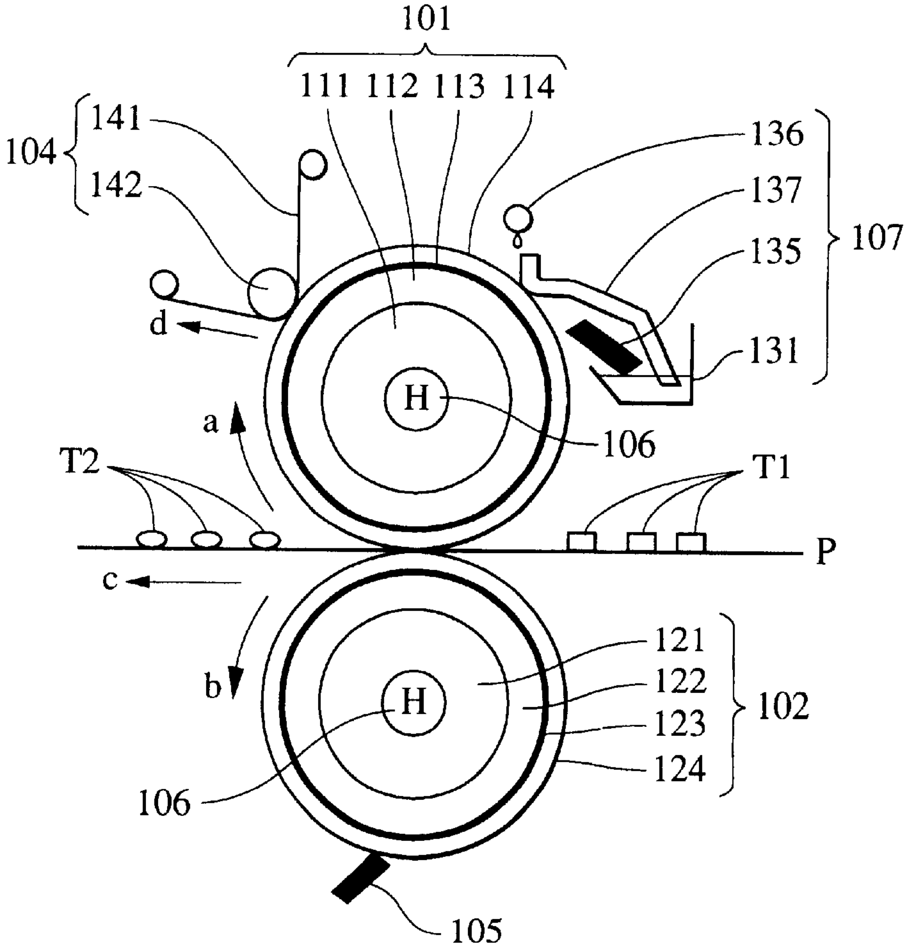
FIG. 7 is a sectional view of a second heat-pressure fixing device used in evaluating examples of the present invention.

FIG. 7 is a sectional view of a second heat-pressure fixing device used in order to verify the advantages of the present invention. The same symbols as those in FIG. 1 are used for the parts which are the same as those in FIG. 1, and a description thereof will be omitted. The second heat-pressure fixing device shown in FIG. 7 includes an oil application unit which is different from that of the first heat-pressure fixing device shown in FIG. 1.

In FIG. 7, an oil application unit 107 includes a hollow pipe 136 for drawing a release oil 132 from an oil tank (not shown in the drawing) up to around the surface of a fixing roller 101 and for dripping the release oil 132 to the surface of the fixing roller 101, and a heat-resistant felt 137 for spreading the dripped release oil 132 on the fixing roller 101, and a regulating blade 135 composed of a fluororubber for regulating the amount of the release oil 132 on the fixing roller 101.

The same blade 135 as that in the first heat-pressure fixing device is used.

In order to verify the advantages of the present invention, the cleaning web unit 104 was detached from the device and was not used. The surface temperatures of the fixing roller 101 and the pressure roller 102 were set at 190° C.

The advantages of the present invention were verified by mounting blades as examples and comparative examples described below instead of the oil-regulating blades 135 in the first and second heat-pressure fixing devices.

(Preparation of Silicone Rubber Solution)

As the silicone rubber for the outermost layer or the tip layer, a silicone rubber solution having a composition described below was used and cured.

First, 100 parts by weight of block copolymer having a viscosity of approximately 30 Pa·s at 25° C. comprising a linear polysiloxane segment having approximately 300 consecutive difunctional dimethylsiloxane units and a pair of branched polysiloxane segments bonded to both ends thereof, each having a vinyl group, were mixed with organopolysiloxane having at least two silicon-bonded hydrogen atoms per molecule as a crosslinking agent in an amount so as to obtain a molar quantity of the hydrogen atoms that was 1.3 times the molar quantity of vinyl groups contained in the ingredients of the block copolymer. A platinum-based catalyst was further added thereto to produce an uncured silicone rubber solution.

DESCRIPTION OF BLADES IN EXAMPLES 1 TO 4 AND IN COMPARATIVE EXAMPLES 1 AND 2

Example 1

Figure 3:
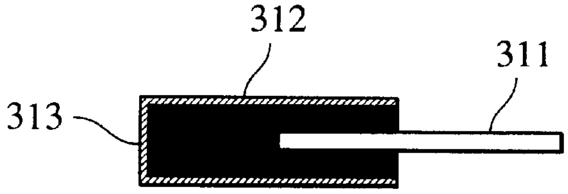
FIG. 3 is a schematic diagram of a blade in Example 1.

A fluororubber blade was produced by vulcanizing and molding a fluororubber polymer (trade name "DAI-EL G-723" manufactured by Daikin Industries, Ltd.). The entire surface of the fluororubber section of the fluororubber blade was subjected to primer treatment, and a toluene-diluted silicone rubber solution was sprayed thereon so as to have a thickness of approximately 40 μm after evaporation of the toluene, followed by standing at room temperature for 30 minutes in order to evaporate the toluene. Next, in a hot-air furnace, primary curing was performed at 130° C. for 1 hour, and then secondary curing was performed at 200° C. for 4 hours to obtain a blade. FIG. 3 is a schematic diagram showing a cross section of the blade in Example 1. The blade includes a metallic plate 311 as a support, a fluororubber layer 312 as an elastic layer formed on the metallic plate 311, and a silicone rubber layer 313 formed on the surface thereof.

Example 2

Figure 4:
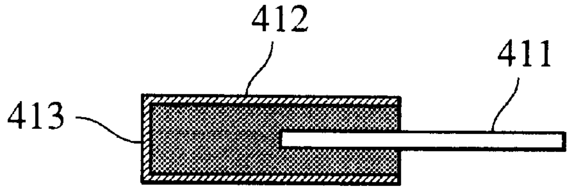
FIG. 4 is a schematic diagram of a blade in Example 2.

A silicone rubber blade was produced by molding, vulcanizing, and bonding a silicone rubber (trade name "DY32-916u" manufactured by Dow Corning Toray Silicone Co., Ltd.) so as to have the same shape as that of the fluororubber layer of the fluororubber blade in Example 1. Next, the entire surface of the silicone rubber blade was subjected to primer treatment, and a toluene-diluted silicone rubber solution was sprayed thereon so as to have a thickness of approximately 20 μm after evaporation of the toluene, followed by standing at room temperature for 30 minutes in order to evaporate the toluene. In a hot-air furnace, primary curing was performed at 130° C. for 1 hour, and then secondary curing was performed at 200° C. for 4 hours to obtain a blade. FIG. 4 is a schematic diagram showing a cross section of the blade in Example 2. The blade includes a metallic plate 411 as a support, a silicone rubber layer (lower layer) 412 as an elastic layer formed on the metallic plate 411, and a silicone rubber layer (upper layer) 413 formed on the surface thereof.

Example 3

Figure 5:
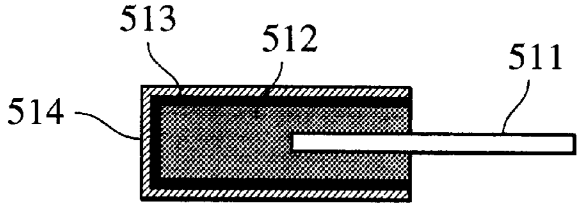
FIG. 5 is a schematic diagram of a blade in Example 3.

A silicone rubber blade was produced by molding, vulcanizing, and bonding a silicone rubber (trade name "DY32-916u" manufactured by Dow Corning Toray Silicone Co., Ltd.) so as to have the same shape as that of the fluororubber layer of the fluororubber blade in Example 1. Next, the entire surface of the silicone rubber blade was subjected to primer treatment, and a polyamine-based fluororubber latex (trade name “DAI-EL GL-252” manufactured by Daikin Industries, Ltd.) was sprayed thereon so as to have a thickness of approximately 40 μm after drying, followed by drying at 50° C. for 30 minutes. A primer was applied thereto, and heat treatment was performed for 60 minutes at 200° C. in a hot-air furnace to cure the fluororubber layer as well as to modify the primer on the surface of the fluororubber layer. Primer treatment was performed again, and a toluene-diluted silicone rubber solution was sprayed so as to have a thickness of approximately 20 μm after evaporation of the toluene, followed by standing at room temperature for 30 minutes in order to evaporate the toluene. In a hot-air furnace, primary curing was performed at 130° C. for 1 hour, and then secondary curing was performed at 200° C. for 4 hours to obtain a blade. FIG. 5 is a schematic diagram showing a cross section of the blade in Example 3. The blade includes a metallic plate 511 as a support, a silicone rubber layer (lower layer) 512 as an elastic layer formed on the metallic plate 511, a mixed layer 513 comprising a fluorine-containing resin and a fluororubber formed on the silicone rubber layer 512, and a silicone rubber layer (upper layer) 514 formed further thereon.

Example 4

Figure 6:
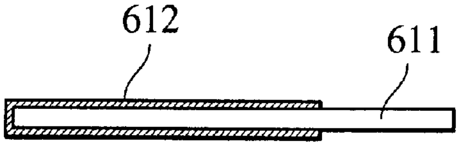
FIG. 6 is a schematic diagram of a blade in Example 4.

The entire surface of a SUS blade, which was formed so that the edge was positioned at the position of the abutting edge of the fluororubber blade in Example 1, was subjected to primer treatment. A toluene-diluted silicone rubber solution was sprayed thereon so as to have a thickness of approximately 30 μm after evaporation of the toluene, followed by standing at room temperature for 30 minutes in order to evaporate the toluene. In a hot-air furnace, primary curing was performed at 130° C. for 1 hour, and then secondary curing was performed at 200° C. for 4 hours to obtain a blade. FIG. 6 is a schematic diagram showing a cross section of the blade in Example 4. The blade includes a metallic plate 611 as a support, and a silicone rubber layer 612 formed thereon.

Comparative Example 1

A fluororubber blade was produced by vulcanizing and molding a fluororubber polymer (trade name “DAI-EL G-723” manufactured by Daikin Industries, Ltd.). The fluororubber blade was used as it was.

Comparative Example 2

The SUS blade formed in Example 4 was used as it was.

VERIFICATION OF ADVANTAGES IN EXAMPLES 1 TO 4 AND IN COMPARATIVE EXAMPLES 1 AND 2

The first heat-pressure fixing device provided with either one of the blades in the examples or the comparative examples was incorporated into the image-forming apparatus, and 10 copies of a yellow image were made using specific OHP film sheets (“OHP film designed for CLC700/800/900” manufactured by CANON KABUSHIKI KAISHA). The copied OHP film sheets were visually checked if oil streaks occurred or not, and this was defined as the initial image performance. Next, with respect to the cases where the initial image performance test was passed, a magenta image was successively copied, and the same evaluation as that for the initial image performance was made every 1,000 sheets. The number of copies made before the occurrence of streaks was recorded as the number of copies for causing streaks. When the number of copies exceeded 50 K (50,000 sheets), the performance was evaluated as 50 K or more, and copying was stopped.

Table 1 shows the evaluation results in the examples and the comparative examples. As is clear from Table 1, superior initial image performance and durability toward oil streaks were verified in the examples of the present invention in comparison with the comparative examples. By observing the blades after the evaluation, an obvious difference in the adhesion of foreign matter, such as toner and dust, between the examples and the comparative examples was confirmed, and the blades in the examples had lower amounts of adhesion. Accordingly, the effects and advantages of the present invention were verified.

Additionally, with respect to the blade bases comprising fluororubbers used in Examples 1 and 3, a change in size in dimethylsilicone oil at 100° C. was measured and the rate of swelling was calculated. As a result, the rate of swelling was very low at 0.1% or less, and it was found that the blades had a satisfactory shape stability.

TABLE 1

| | Base | Outermost layer | Initial image performance | Number of copies for causing streaks |
|---|---|---|---|---|
| Example 1 | Fluororubber blade | Silicone rubber | A | 50 K or more |
| Example 2 | Silicone rubber blade | Silicone rubber | A | 50 K or more |
| Example 3 | blade composed of silicone rubber coated with fluororubber | Silicone rubber | A | 50 K or more |
| Example 4 | SUS blade | Silicone rubber | A | 50 K or more |
| Comparative Example 1 | Fluororubber blade | None | A | 9 K |
| Comparative Example 2 | SUS blade | None | A | 7 K |

A: No streaks
B: Streaks observed

Furthermore, the second heat-pressure fixing device provided with either one of the blades in the examples and the comparative examples was incorporated into the image-forming apparatus, and the same evaluation as described above was carried out. As a result, the effects and advantages of the present invention were also verified.

DESCRIPTION OF BLADES IN EXAMPLES 5 AND 6 AND IN COMPARATIVE EXAMPLE 3

Example 5

A fluororubber blade was produced by vulcanizing and molding a fluororubber polymer (trade name “DAI-EL G-723” manufactured by Daikin Industries, Ltd.). The tip of the resulting fluororubber blade was cut by a thickness of 1.5 mm, and the cut surface was subjected to primer treatment, on which a silicone rubber layer with a thickness of 1.5 mm was formed by molding. For the molding, compression molding was employed, in which the blade and a material for the silicone rubber were loaded into a mold that is dividable into a plurality of parts, and curing was performed while applying heat and pressure by hot plate pressing. The curing was performed at 130° C. for 10 minutes. The blade in which the silicone rubber layer was formed on the tip of the fluororubber layer was stripped of the mold, and in a hot-air furnace, secondary curing was performed at 200° C. for 4 hours to obtain a blade.

With respect to the mold used in the above, in particular, the edge section was formed with high precision so that the edge on the tip of the silicone rubber layer provides satisfactory regulating performance.

Example 6

A fluororubber blade was produced by vulcanizing and molding a fluororubber polymer (trade name "DAI-EL G-723" manufactured by Daikin Industries, Ltd.). The tip of the resulting fluororubber blade was cut by a thickness of 1.0 mm, and the cut surface was subjected to primer treatment, on which a silicone rubber layer with a thickness of 11 mm was formed by molding in a similar manner to that in Example 5. The blade in which the silicone rubber layer was formed on the tip of the fluororubber layer was stripped of the mold, and in a hot-air furnace, secondary curing was performed at 200° C. for 4 hours. The silicone rubber layer was then cut by a sharp cutter parallel to the tip surface of the fluororubber layer so that the silicone rubber layer formed on the tip of the fluororubber layer had a thickness of 1.0 mm, and thus a blade was obtained.

Figure 8:
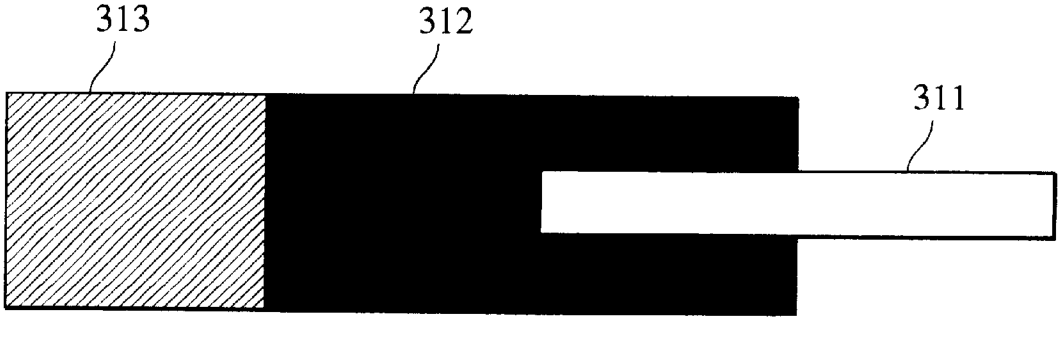
FIG. 8 is a sectional view of the blade in Example 5 or 6.

FIG. 8 is a schematic diagram which shows a cross section of the blade produced in Examples 5 and 6.

Comparative Example 3

A fluororubber blade as a standard accessory in the experimental machine was used as it was.

VERIFICATION OF ADVANTAGES IN EXAMPLES 5 AND 6 AND IN COMPARATIVE EXAMPLE 3

The advantages of the blades in Examples 5 and 6 and in Comparative Example 3 were verified in a manner similar to that in Examples 1 to 4 and in Comparative Examples 1 and 2.

Table 2 shows the evaluation results in the examples and the comparative example. As is clear from Table 2, superior initial image performance and durability toward oil streaks were verified in the examples of the present invention in comparison with the comparative example. By observing the blades after the evaluation, an obvious difference in the adhesion of foreign matter, such as toner and dust, between the examples and the comparative example was confirmed, and the blades in the examples had lower amounts of adhesion. Accordingly, the effects and advantages of the present invention were verified.

Additionally, with respect to the blade bases comprising the fluororubber used in Examples 5 and 6, a change in size in dimethylsilicone oil at 100° C. was measured and the rate of swelling was calculated. As a result, the rate of swelling was very low at 0.1% or less, and it was found that the blades had satisfactory shape stability.

Furthermore, it was also found that the blade produced in Example 6 had excellent edge characteristics and the release oil was effectively regulated.

TABLE 2

| | Base | Tip layer | Initial image performance | Number of copies for causing streaks |
|---|---|---|---|---|
| Example 5 | Fluororubber blade | Silicone rubber | A | 50 K or more |
| Example 6 | Fluororubber blade | Silicone rubber | A | 50 K or more |
| Comparative Example 3 | Fluororubber blade | None | A | 10 K |

A: No streaks
B: Streaks observed

Furthermore, the second heat-pressure fixing device provided with either one of the blades in Examples 5 and 6 and Comparative Example 3 was incorporated into the image-forming apparatus, and the same evaluation as described above was carried out. As a result, the effects and advantages of the present invention were also verified.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A blade for regulating the amount of a release oil to be supplied, placed so as to abut on a fixing member or on a member for controlling the amount of the release oil to be supplied to the fixing member, wherein the abutting surface of the blade comprises a silicone rubber layer having a thickness of 1 $\mu$m to 100 $\mu$m.

2. A blade for regulating the amount of a release oil to be supplied, placed so as to abut on a fixing member or on a member for controlling the amount of the release oil to be supplied to the fixing member, wherein the abutting surface of the blade comprises a silicone rubber layer, wherein the silicone rubber layer is formed on the surface of a blade base comprising an elastic body, and wherein the elastic body comprises a fluororubber.

3. A blade according to claim 2, wherein the elastic body has a rate of swelling of 1% or less in a release oil at 100° C.

4. A blade for regulating the amount of a release oil to be supplied, placed so as to abut on a fixing member or on a member for controlling the amount of the release oil to be supplied to the fixing member, wherein the abutting surface of the blade comprises a silicone rubber layer, wherein the silicone rubber layer is formed on the surface of a blade base comprising an elastic body, and wherein the elastic body comprise a silicone rubber.

5. A blade for regulating the amount of a release oil to be supplied, placed so as to abut on a fixing member or on a member for controlling the amount of the release oil to be supplied to the fixing member, wherein the abutting surface of the blade comprises a silicone rubber layer, wherein the silicone rubber layer is formed on the surface of a blade base comprising an elastic body, and wherein the elastic body comprises a silicone rubber coated with a fluororubber.

6. A blade according to claim 5, wherein the elastic body has a rate of swelling of 1% or less in a release oil at 100° C.

7. A fixing device for heat-pressure fixing of an unfixed image on a recording member comprising:

fixing members rotatably disposed and abutting on each other for sandwiching and passing the recording member through the abutting section; and a blade according to any one of claims 1–6 for regulating the amount of a release oil to be supplied to the fixing members.

8. An image-forming apparatus comprising:

a fixing device according to claim 7; and image-forming means for forming an unfixed image on a recording member, wherein the unfixed image formed on the recording member by the image-forming means is fixed by the fixing device.

9. A blade for regulating the amount of a release oil to be supplied, placed so as to abut on a fixing member or on a member for controlling the amount of the release oil to be supplied to the fixing member, the blade comprising a plate-shaped elastic body comprising a fluororubber and a silicone rubber layer formed on the tip of the elastic body.

10. A blade for regulating the amount of a release oil to be supplied, placed so as to abut on a fixing member or on a member for controlling the amount of the release oil to be supplied to the fixing member, the blade comprising a plate-shaped elastic body and a silicone rubber layer formed on the tip of the elastic body, wherein the elastic body comprises a silicone rubber.

11. A blade for regulating the amount of a release oil to be supplied, placed so as to abut on a fixing member or on a member for controlling the amount of the release oil to be supplied to the fixing member, the blade comprising a plate-shaped elastic body and a silicone rubber layer formed on the tip of the elastic body, wherein the elastic body comprises a silicone rubber coated with a fluororubber.

12. A blade according to any one of claims 9, 10 or 11, wherein the elastic body has a rate of swelling of 1% or less in a release oil at 100° C.

13. A blade according to any one of claims 9, 10 or 11, wherein the silicone rubber layer is formed by being cut in the longitudinal direction so that the blade has a sharp edge section.

14. A fixing device for heat-pressure fixing of an unfixed image on a recording member comprising:

fixing members rotatably disposed and abutting on each other for sandwiching and passing the recording member through the abutting section; and a blade for regulating the amount of a release oil to be supplied to the fixing members according to claim 13.

15. An image-forming apparatus comprising:

a fixing device according to claim 14; and image-forming means for forming an unfixed image on a recording member, wherein the unfixed image formed on the recording member by the image-forming means is fixed by the fixing device.

16. A fixing device for heat-pressure fixing of an unfixed image on a recording member comprising:

fixing members rotatably disposed and abutting on each other for sandwiching and passing the recording member through the abutting section; and a blade for regulating the amount of a release oil to be supplied to the fixing members according to any one of claims 9, 10 or 11.

17. An image-forming apparatus comprising:

a fixing device according to claim 16; and image-forming means for forming an unfixed image on a recording member, wherein the unfixed image formed on the recording member by the image-forming means is fixed by the fixing device.

* * * * *

UNITED STATES PATENT AND TRADEMARK OFFICE

CERTIFICATE OF CORRECTION

PATENT NO. : 6,363,236 B1
DATED : March 26, 2002
INVENTOR(S) : Jiro Ishizuka et al.

It is certified that error appears in the above-identified patent and that said Letters Patent is hereby corrected as shown below:

Column 12,
Line 56, "comprise" should read -- comprises --.

Signed and Sealed this

Eighteenth Day of June, 2002

*Attest:*

JAMES E. ROGAN

*Attesting Officer* *Director of the United States Patent and Trademark Office*